United States Patent
Mor-Yosef

(10) Patent No.: US 9,259,814 B2
(45) Date of Patent: Feb. 16, 2016

(54) BLANKET REPLACEMENT SYSTEM AND METHOD THEREOF

(75) Inventor: Avichay Mor-Yosef, Jerusalem (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 164 days.

(21) Appl. No.: 14/240,446

(22) PCT Filed: Oct. 25, 2011

(86) PCT No.: PCT/IL2011/000825
§ 371 (c)(1),
(2), (4) Date: Feb. 24, 2014

(87) PCT Pub. No.: WO2013/061315
PCT Pub. Date: May 2, 2013

(65) Prior Publication Data
US 2014/0182106 A1    Jul. 3, 2014

(51) Int. Cl.
*G03G 15/00* (2006.01)
*B23P 19/04* (2006.01)
*G03G 15/16* (2006.01)
*G03G 21/16* (2006.01)

(52) U.S. Cl.
CPC ............ *B23P 19/04* (2013.01); *G03G 15/1605* (2013.01); *G03G 21/168* (2013.01); *Y10T 29/49815* (2015.01); *Y10T 29/49826* (2015.01); *Y10T 29/53* (2015.01)

(58) Field of Classification Search
CPC ............ G03G 15/1605; G03G 15/161; G03G 15/0189; G03G 15/0131; B41F 30/00; B41F 30/02; B41F 30/04; B41F 27/06; B41F 27/1206; B41F 27/125; B41F 27/1268
See application file for complete search history.

(56) References Cited

U.S. PATENT DOCUMENTS

| | | | |
|---|---|---|---|
| 1,967,266 A | 7/1934 | Rowell | |
| 3,844,214 A | 10/1974 | Smith | |
| 5,181,466 A | 1/1993 | Ono | |
| 5,218,906 A | 6/1993 | Doersam | |
| 5,337,664 A | 8/1994 | Hannon | |
| 2005/0016403 A1* | 1/2005 | Becker et al. | 101/477 |
| 2006/0272531 A1* | 12/2006 | Iyokawa et al. | 101/477 |
| 2007/0084371 A1 | 4/2007 | Nagler et al. | |
| 2007/0125251 A1 | 6/2007 | Bernard et al. | |
| 2009/0205525 A1* | 8/2009 | Fujishiro | 101/477 |
| 2011/0226146 A1 | 9/2011 | Greive et al. | |

FOREIGN PATENT DOCUMENTS

| | | |
|---|---|---|
| JP | 2229046 | 9/1990 |
| WO | WO-2010085238 | 7/2010 |

\* cited by examiner

*Primary Examiner* — Blake A Tankersley

(57) ABSTRACT

Blanket replacement systems and methods useable with an image forming apparatus are provided herein. The blanket replacement system removes the blanket from the image transfer member and attaches the blanket to the image transfer member. The blanket replacement system includes a frame member, an engagement motor, and a rotation motor. The frame member holds a blanket having a lead edge portion on one edge and a trail edge portion on an opposing edge. The frame member further includes a lead edge clamp unit and a trail edge clamp unit that holds the lead edge and trail edge portions of the blanket and engages with an image transfer member. The engagement motor engages with the frame member and moves the frame member laterally in relation to the engagement motor. The rotation motor is connected to the engagement motor and rotates the engagement motor and the frame member.

15 Claims, 8 Drawing Sheets

BLANKET SYSTEM
20

FRAME MEMBER
22

ENGAGEMENT MOTOR
24

ROTATION MOTOR
26

*Fig. 2*

BLANKET REPLACEMENT SYSTEM AND METHOD THEREOF

BACKGROUND

Image forming apparatuses, such as liquid electrophotography (LEP) systems, form images on media. Liquid electrophotography systems include a fluid applicator unit, a photoconductive member, an image transfer member, and an impression member. The image formed on the photoconductive member is transferred to the image transfer member, and then is provided to the media. An impression member may be used to transfer the image from the image transfer member to the media.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

FIG. 2 illustrates a block diagram illustrating a blanket replacement system according to an example;

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

A roller system of an image forming apparatus includes an image transfer member, such as an intermediate transfer member (ITM), and a roller device, such as an impression drum. The image transfer member has a replaceable blanket attached to the outer surface to receive the fluid image and transfer the fluid image to a media. The blanket includes an outer surface with rubber to receive the fluid, such as ink, and fabric opposing the outer surface to hold the blanket to the image transfer member. The blanket is replaced on a regular basis during normal use. Replacement of the blanket usually occurs manually; however the location of the image transfer member makes it difficult to access and replace the blanket manually. Moreover, manual replacement of the blanket may take a long time and may result in mistakes, leading to loss of profits due to more frequent replacement of the blanket and longer downtime of the image forming apparatus.

In examples, blanket replacement systems and methods are provided to replace the blanket. The blanket replacement system includes a frame member, an engagement motor, and a rotation motor. The frame member holds a blanket having a lead edge portion on one edge and a trail edge portion on an opposing edge. The frame member further includes a lead edge clamp unit and a trail edge clamp unit that holds the lead edge and trail edge portions of the blanket and engages with an image transfer member. The engagement motor engages with the frame member and moves the frame member laterally in relation to the engagement motor. The rotation motor is connected to the engagement motor and rotates the engagement motor and the frame member. The blanket replacement system removes the blanket from the image transfer member and attaches the blanket to the image transfer member using a blanket device that replaces manual replacement by a user and provides for a quicker and more accurate replacement of the blanket.

Figure 1:
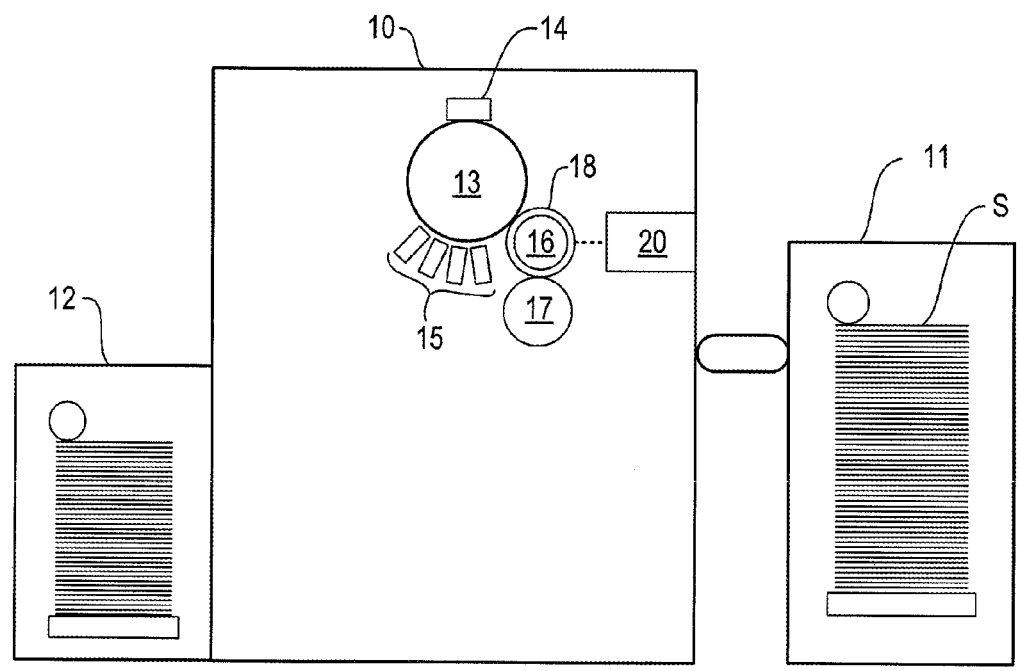
FIG. 1 illustrates a schematic view illustrating an image forming apparatus according to an example.

FIG. 1 is a schematic view illustrating an image forming apparatus, such as a liquid electrophotography system (LEP), according to an example. The LEP 100 includes an image forming unit 10 that receives a media S from an input unit 11 and outputs the media S to an output unit 12. The image forming unit 10 includes a photoconductive member 13 on which images can be formed. The photoconductive member 14 may be charged with a suitable charger (not illustrated), such as a charge roller. Portions of the outer surface of the photoconductive member 13 that correspond to the features of the image can be selectively discharged by a laser writing unit 14 to form an electrostatic and/or latent image thereon.

Referring to FIG. 1, the LEP 100 also includes an applicator unit 15 to apply ink, such as a liquid toner, for example, ElectroInk, trademarked by Hewlett-Packard Company, to the electrostatic and/or latent image on the photoconductive member 13. The ink in the ink applicators is monitored for proper high field conductivity. The ink is applied to the photoconductive member 13 to form a fluid image to be transferred to a roller system, including an image transfer member 16, such as an intermediate transfer member (ITM) and a roller device 17, such as an impression member. The image transfer member 16 has a replaceable blanket 18 attached thereto with a rubber side to receive the fluid image and a fabric side to hold the blanket 18 to the image transfer member 16.

The fluid image is transferred to the media S using the image transfer member 16 and the blanket 18. The blanket 18 receives the fluid image from the photoconductive member 13, the image transfer member 16 heats the fluid image, and the blanket 18 transfers the fluid image to the media S. During the transfer of the fluid image from the image transfer member 16 to the media S, the media S is pinched between the image transfer member 16 and the roller device 17. Once the fluid image has been transferred to the media S, the media S can be transported to the output unit 12. When the blanket 18 is replaced, a blanket replacement system 20 may be activated to replace the blanket 18. For example, the blanket 18 may be replaced by the blanket replacement system 20 between a specified number of printed pages and/or print jobs.

Figure 3:
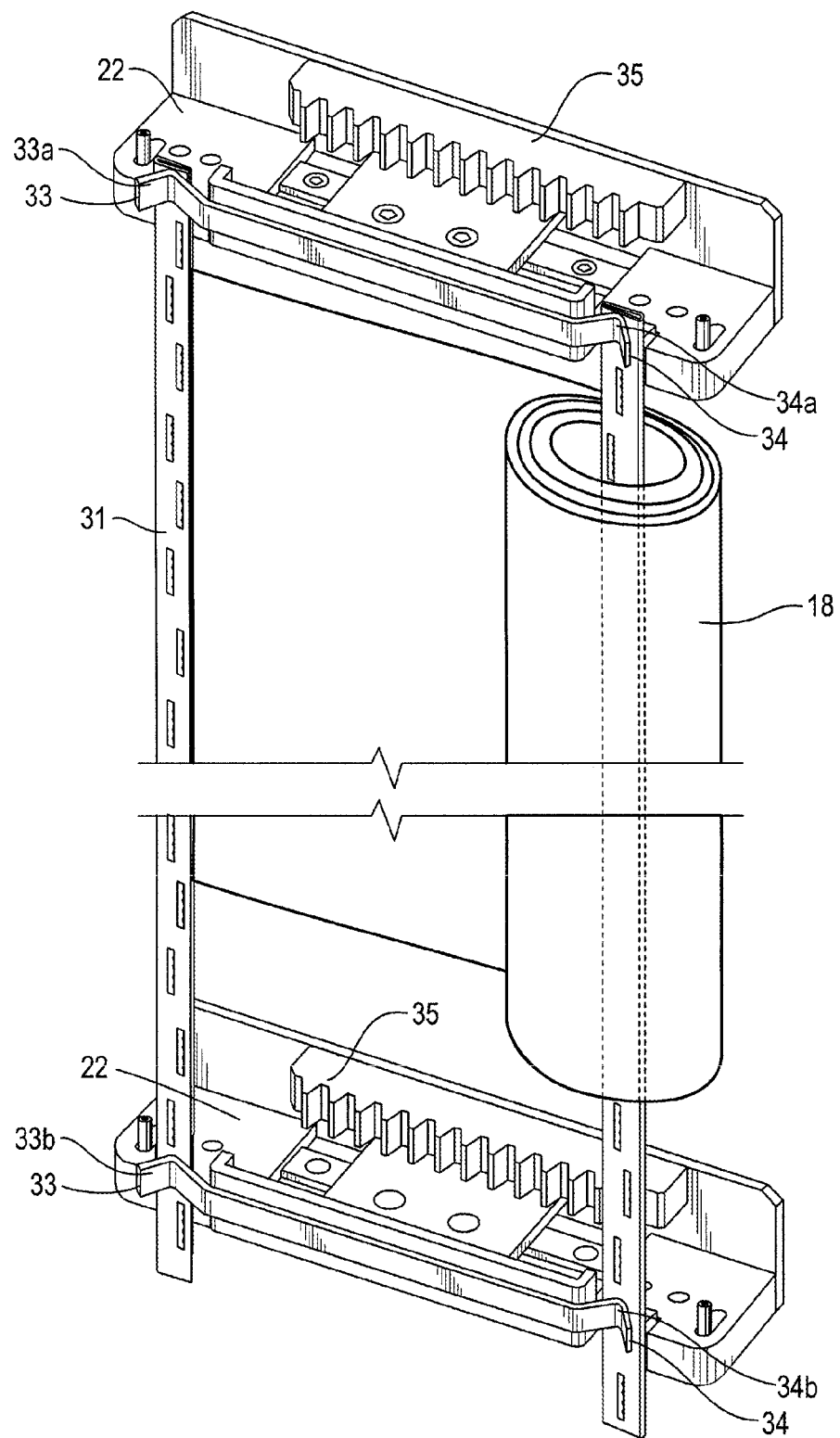
FIG. 3 illustrates a perspective view of a frame member and a blanket according to an example.

FIG. 2 is a block diagram illustrating a blanket replacement system 20 according to an example. The blanket replacement system 20 is useable with an image forming apparatus 10. The blanket replacement system 20 includes a frame member 22, an engagement motor 24, and a rotation motor 26. FIG. 3 illustrates a perspective view of the frame member 22 and the blanket 18 according to an example.

Referring to FIGS. 2-3, the frame member 22 holds a blanket 18. The blanket 18 has a lead edge portion 31 on one edge and a trail edge portion 32 on an opposing edge. The frame member 22 includes at least one lead edge clamp unit 33 and at least one trail edge clamp unit 34, formed, for example, using a spring. The lead edge clamp unit 33 holds the lead edge portion 31 of the blanket 18. For example, there may be two lead edge clamp units 33a, 33b, one holding down each edge of the lead edge portion 31 of the blanket 18. The trail edge clamp unit 34 holds the trail edge portion 32 of the blanket 18. For example, there may be two trail edge clamp units 34a, 34b, one holding down each edge of the trail edge portions 32 of the blanket 18.

The lead edge clamp unit 33 and the trail edge clamp unit 34 engage with the image transfer member 16 to perform at least one of removal of the blanket 18 from the image transfer member 16 and attachment of the blanket 18 to the image transfer member 16. The frame member 22 also engages with the engagement motor 24 using, for example, a set of frame gears 35 to move the frame member 22 laterally in relation to the engagement motor 24.

Figure 4:
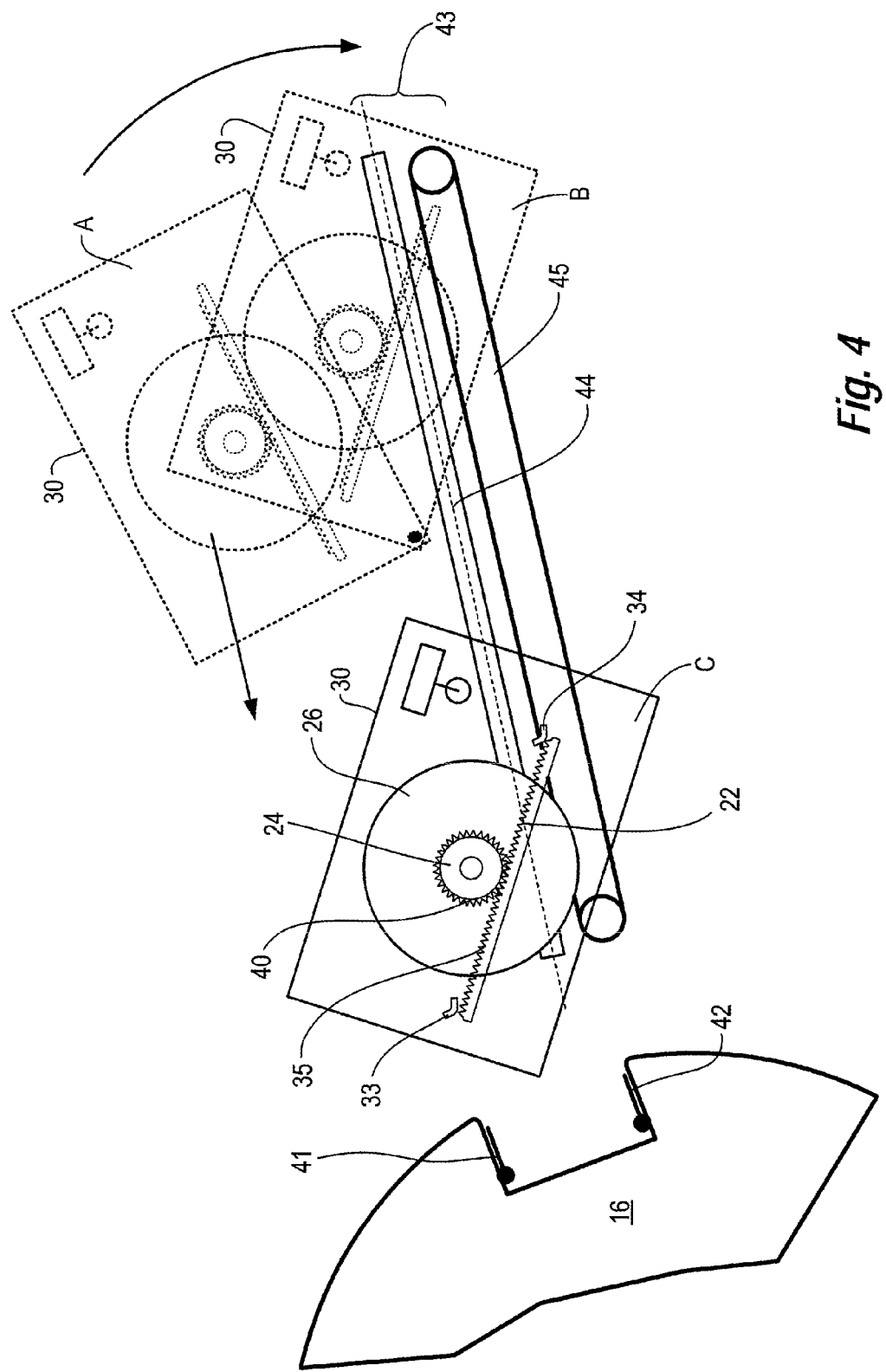
FIG. 4 illustrates a schematic view illustrating the blanket replacement system of FIG. 2 according to an example.

FIG. 4 illustrates a schematic view of the blanket replacement system 20 of FIG. 2 according to an example. A portion of the blanket replacement system 20 is represented in a dotted line box including the frame member 22, the engagement motor 24, and the rotation motor 26, which form a blanket device 30 that operates in a synchronized manner.

The engagement motor 24 engages with the frame member 22 and moves the frame member 22 laterally in relation to the engagement motor 24. The engagement motor 24 and the frame member 22 engage with one another using, for example, the set of frame gears 35 and an engagement pinion 40 that enable lateral motion of the frame member 22 with respect to the engagement motor 24. For example, the engagement motor 24 moves the lead edge clamp unit 33 and the trail edge claim unit 34 towards and away from the image transfer member 16. The engagement motor 24 is utilized for movements of the frame member 22 to enable engagement between the frame member 22 and the image transfer member 18. For example, the at least one lead edge clamp unit 33 also engages with at least one lead edge holding member 41 of an image transfer member 16 of the image forming apparatus 10. At least one of the trail edge clamp units 34 engage with at least one trail edge holding member 42 of the image transfer member 16.

In contrast, the rotation and the angular position of the frame member 22 are controlled by the rotation motor 26. The engagement motor 24 and the rotation motor 26 work in combination and/or synchronization to position the frame member 22. The rotation motor 26 is connected to the engagement motor 24. The rotation motor 26 rotates the engagement motor 24 and the frame member 22. For example, the rotation motor 26 rotates while the engagement motor 24 and the frame member 22 remain fixed. In operation, the rotation motor 26, the engagement motor 24, and the frame member 22 rotate as one object to roll the blanket 18 onto the frame member 22 and/or unroll the blanket 18 from the frame member 22.

As illustrated in FIG. 3, the blanket device 30 may include two frame members 22 such that there is a frame member 22 on each side of the blanket 18. Similarly, the blanket device 30 may also include two engagement motors 24 and two rotation motors 26, such as one on each side of the blanket 18. The engagement motor 24 and the rotation motor 26 may further include encoders to measure and calibrate the rotation.

The blanket replacement system 20 may further include a transport unit 43 connected to the blanket device 30. The transport unit 43 may include a rail 44 and a timing belt 45 that moves the blanket device 30 towards and away from the image transfer member 16. The timing belt 45 may be controlled by a transport motor 46 and a transport encoder 47 that measures the angular position of the transport motor 46. For example, the transport unit 43 may move the blanket device 30 between a holding position A and an active position B and then between the active position B and a working position C, via the rail 44. In the working position C, the frame member 22 may engage with the image transfer member 16 to remove and/or attach the blanket 18.

Figure 5:
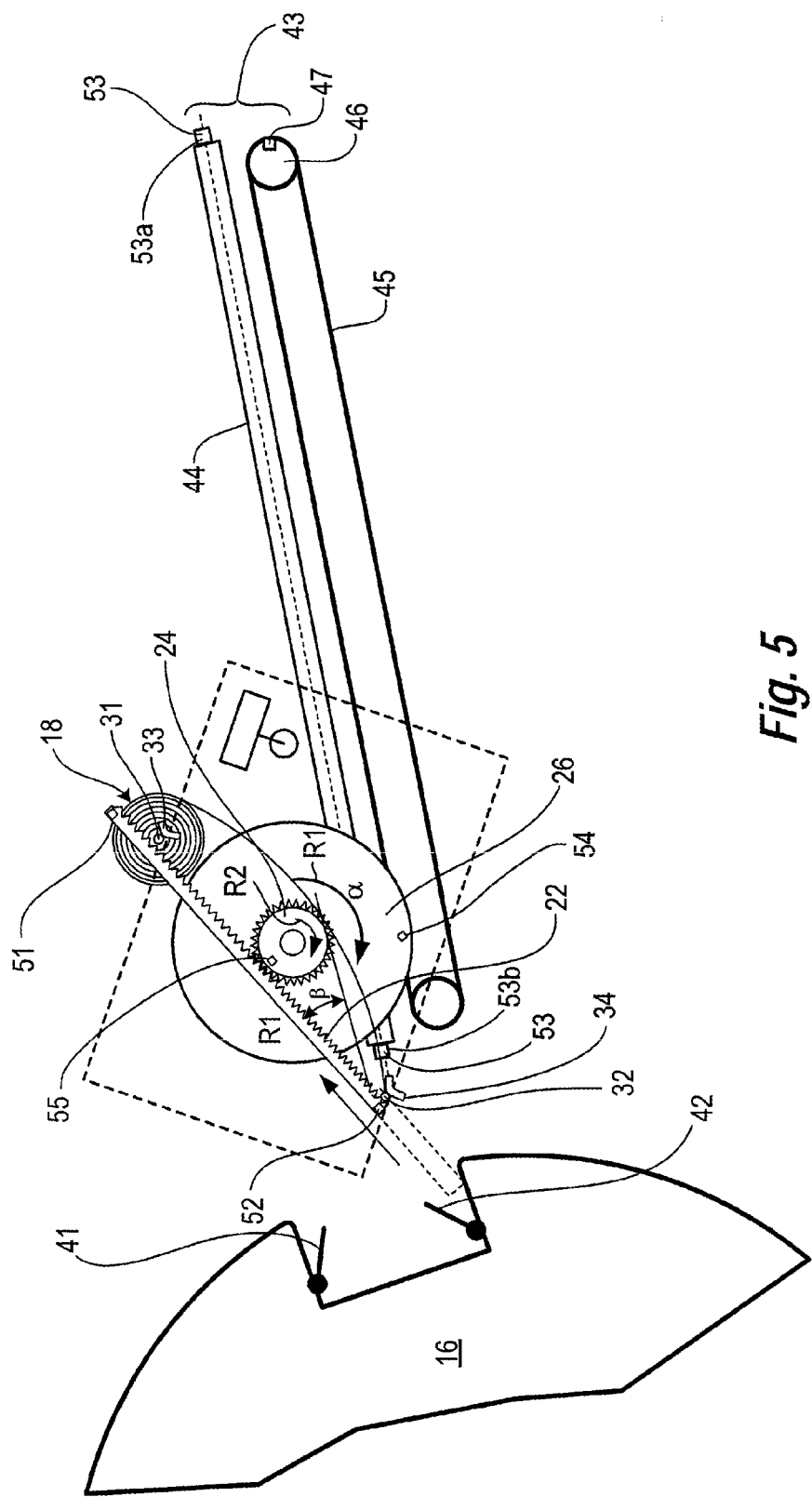
FIG. 5 illustrates a schematic view illustrating removal of the blanket using the blanket replacement system of FIG. 2 according to an example.

FIG. 5 is a schematic view illustrating removal of the blanket 18 using the blanket replacement system 20 of FIG. 2 according to an example. The blanket replacement system 20 positions the blanket device 30 in proximity to the image transfer member 16, for example in working position C of FIG. 4. For example, the frame member 22 is rotated into position by the rotation motor 26. The rotation motor 26 rotates R1 to position the frame member 22 in relation to the image transfer member 16, such that the rotation motor may rotate by an angle α. The engagement motor 24 rotates R2 to laterally move the lead edge clamp unit 33 and the frame member 22 towards the image transfer member 16. The engagement motor 24, for example, is rotated by an angle β to move the frame member 22 laterally into position.

After the frame member 22 is moved laterally and rotationally into position, the frame member 22 engages the lead edge clamp unit 33 and the lead edge holding member 41 to connect the lead edge clamp unit 33 to the lead edge portion 31 of the blanket 18. The lead edge portion 31 of the blanket 18 attaches to the lead edge clamp unit 33. The engagement between the lead edge clamp unit 33 and the lead edge portion 31 releases the lead edge portion 31 of the blanket 18 from the image transfer member 16 by releasing the lead edge holding member 41 from a closed position 41a to an open position 41b.

Figure 6:
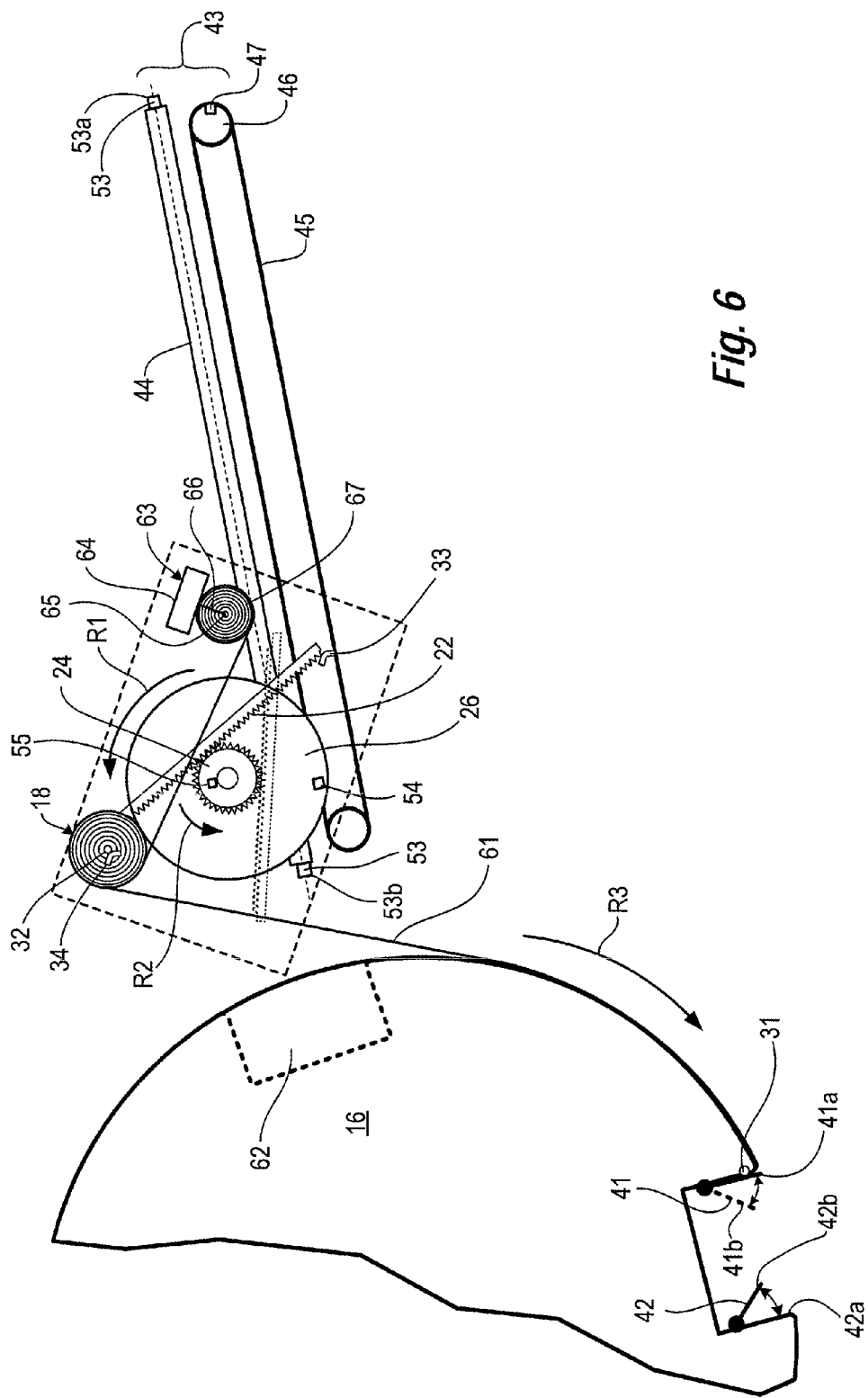
FIG. 6 illustrates a schematic view illustrating attachment of the blanket using the blanket replacement system of FIG. 2 according to an example.

The rotation of the frame member 22 by the rotation motor 26 separates the blanket 18 from the image transfer member 16. The lead edge clamp unit 33 collects the blanket 18 as the frame member 22 rotates. Additionally, image transfer member 16 also rotates in synchronization with the frame member 22 to remove the blanket 18 from the image transfer member 16. Tension may be formed in the blanket 18 between the image transfer member 16 and frame member 22 to release and collect the blanket 18. FIG. 6 below illustrates an example of the tension. The engagement of the trail edge clamp unit 34 and the trail edge holding member 42 releases the trail edge portion 32 of the blanket 18 from the image transfer member 16 by, for example, opening the trail edge holding member 42 from a closed position 42a to an open position 42b. The blanket 18 is attached to the frame member 22 and carried by the blanket device 30 to active position B of FIG. 4. Once the blanket 18 is in active position B, a user may manually remove the blanket 18 from the frame member 22 and replace it with a new blanket 18.

Referring to FIG. 5, the blanket replacement system 20 further includes a sensor unit. The sensor unit includes at least one of a lead edge sensor 51, a trail edge sensor 52, a transport sensor 53, a rotation encoder 54, and an engagement encoder 55. The lead edge sensor 51 and the trail edge sensor 52 may each include two sensors positioned on the lead edge clamp unit 33 and the trail edge clamp unit 34 of the frame member 22. For example, the lead edge sensors 51 may position the lead edge clamp unit 33 in proximity to the lead edge holding member 41 of the image transfer member 16, and the trail edge sensors 52 may positioned the trail edge clamp unit 34 in proximity to the trail edge holding member 42 of the image transfer member 16. The engagement motor 24 and the rotation motor 26 may be used to laterally move and rotate the frame member 22 into position using the sensors.

The transport sensor 53 is illustrated to include two transport sensors 53a, 53b located on opposite ends of the rail 44; however, any number of transport sensors 53 may be positioned within the transport unit 43, such as along the rail 44 and/or timing belt 45. The transport sensors 53a, 53b are positioned along the transport unit 43 to position and/or monitor the blanket device 30 along the rail 44. The rotation encoder 54 measures the first angular position α of the rotation motor 26. The engagement encode 55 measures the second angular position β of the engagement motor 24. For example, the rotation motor 26 and/or the engagement motor 24 may control torque using positioning sensors to verify the position of the blanket device 30. The frame member 22 may also include micro-switches that work with the lead edge sensor 51 and the trail edge sensor 52 to sense the position of the lead edge clamp unit 33 and the trail edge clamp unit 34 on each of the edges.

FIG. 6 is a schematic view illustrating attachment of the blanket 18 using the blanket replacement system of FIG. 2 according to an example. The blanket 18 is attached to the blanket device 30, for example, the blanket 18 may be manually attached to the frame member 22. The attachment includes the lead edge portion 31 of the blanket 18 being attached to the lead edge clamp unit 33 and the trail edge portion 32 of the blanket 18 being attached to the trail edge clamp unit 34. Once the blanket 18 is attached to the frame member 22, the blanket device 30 is moved along the transport unit 43 from the active B position to the working C position.

The blanket replacement system 20 engages the lead edge clamp unit 33 and the lead edge holding member 41 to attach the lead edge portion 31 of the blanket 18 to the image transfer member 16. For example, the frame member 22 engages with the lead edge holding member 41 and inserts the lead edge portion 31 of the blanket 18 onto the image transfer member 16. The lead edge holding member 41 moves to a closed position 41a from an open position 41b to hold the blanket 18 thereon.

The rotation motor 26 rotates the frame member 22 to position the blanket 18 onto the image transfer member 16. For example, the rotation motor 26 and the image transfer member 16 may move in opposite directions, such as the rotation motor 26 moving counter clockwise R1 and the image transfer member 16 moving clockwise R3 to attach the blanket 18 to the image transfer member 16. During the rotation of the rotation motor 26 and the image transfer member 16, the tension 61 holds the blanket 18 against the image transfer member 16. Moreover, the blanket replacement system 20 remains in proximity to the image transfer member 16, but at varying locations 62. The movement of the image transfer member 16 allows the blanket 18 to be positioned onto the image transfer member 16 using the blanket replacement system 20. After the blanket 18 is attached to the image transfer member 16, the trail edge clamp unit 34 and the trail edge holding member 42 engage to attach a trail edge portion 32 of the blanket 18 to the image transfer member 16. The engagement includes the trail edge clamp unit 34 engaging with the trail edge holding member 36 to connect the trail edge portion 32 of the blanket 18 to the image transfer member 16 and hold the blanket 18 in position with the trail edge holding member 42 moving to a closed position 42a from an open position 42b.

Referring to FIG. 6, the blanket replacement system 20 may further include a paper collection device 63 having a collection motor 64 to rotate in synchronization with the rotation motor 26 using a collection encoder 65 to measure the angular position of the collection motor 64. For example, the collection motor 64 may rotate three times for every one rotation of the rotation motor 26. The collection device 63 also includes a collection unit 66 to collect a blanket paper 67 separated from the blanket 18 as the blanket 18 is attached to the image transfer member 16.

A control algorithm may be used to assist with removing and/or attaching the blanket 18 based on the tension 61. For example, in a tension control algorithm, the tension of blanket 18 or blanket paper 67 is determined by setting the current of the applicable motors, such as the engagement motor 24, the rotation motor 26, and/or the collection motor 64. The equation for torque (T) may be equal to current multiplied by a motor factor. Alternatively, the equation for torque may be equal to radius of the force multiplied by substrate tension, where the substrate tension is determined by the current setting, such that the current setting is force equal to current multiplied by a motor factor and divided by the radius of the force. A position algorithm may also be used in combination with the control algorithm or alone. The position algorithm controls the blanket 18 at different timing and/or stages. For example, when the tension 61 is sensed and controlled by the engagement motor 24, the rotation motor 26, and/or the collection motor 64, the position control may be performed by the encoders.

Figure 7:
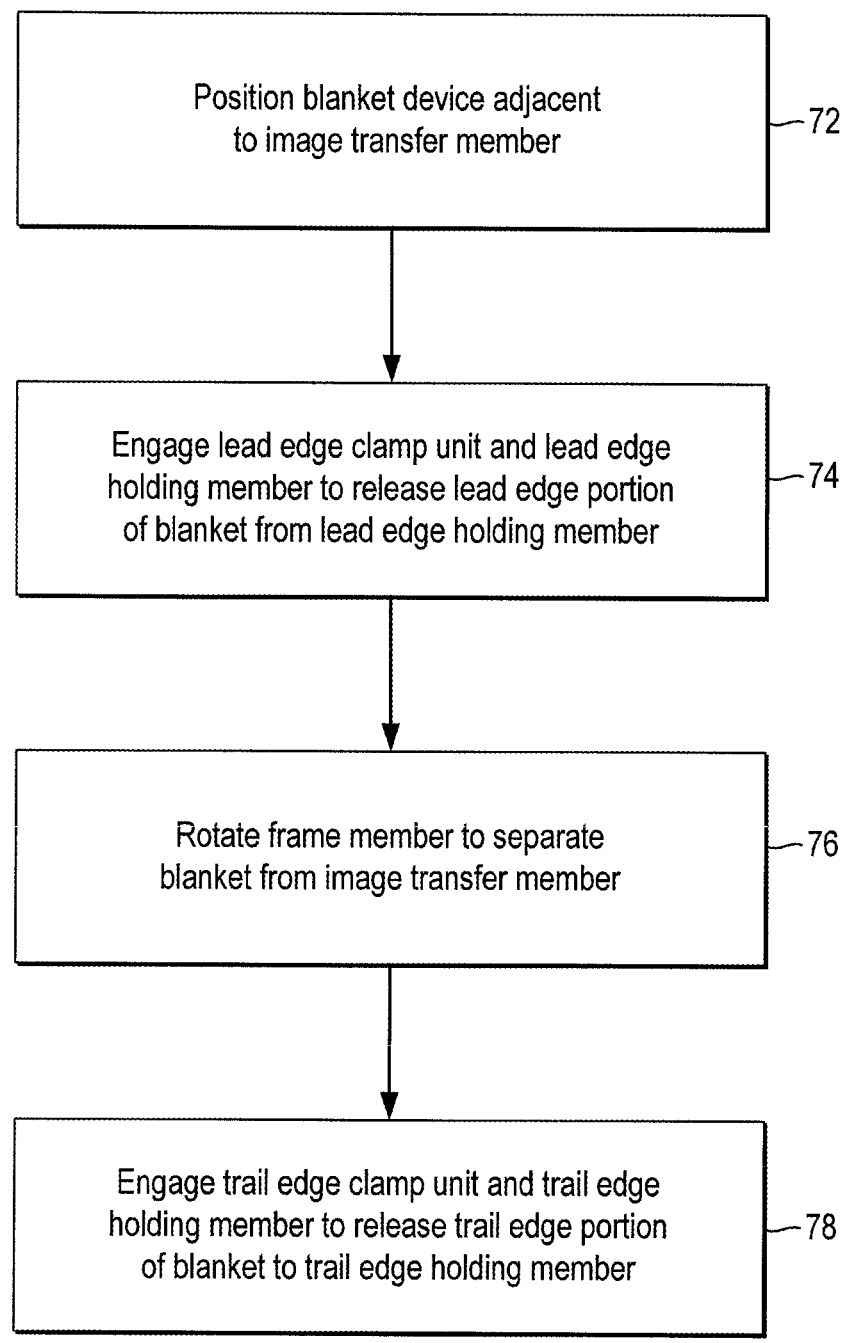
FIG. 7 illustrates a flow chart of a method to remove the blanket from an image forming member according to an example.

FIG. 7 illustrates a method 700 to remove a blanket from an image transfer member according to an example. In block 72, the method 700 positions a blanket device adjacent to the image transfer member. The blanket device is positioned by manual rotation of the blanket device from a storage position to an active position. In the active position, the blanket device is transported towards and away from the image transfer member using a transport unit including a timing belt and a rail.

The blanket device includes a frame member, an engagement motor, and a rotation motor. The frame member holds a blanket. The blanket having a lead edge portion on one edge and a trail edge portion on an opposing edge. The frame member includes at least one lead edge clamp unit and at least one trail edge clamp unit that engage with the image transfer member. The engagement motor engages with the frame member and moves the frame member laterally in relation to the engagement motor. The rotation motor is connected to the engagement motor and rotates the engagement motor and the frame member.

In block 74, at least one lead edge clamp unit and a lead edge holding member of the image transfer member engage. The engagement releases the lead edge portion of the blanket from a lead edge holding member of the image transfer member. The rotation of the engagement motor and the angular position of the image transfer member are synchronized to enable engagement therebetween. The frame member is rotated by the rotation member in block 76 to separate the blanket from the image transfer member. The frame member and the image transfer member are both rotated in synchronization to position the blanket onto the image transfer member. The rotation also provides tension between the image transfer member and the frame member to remove the blanket from the image transfer member. In block 78, the at least one lead edge clamp unit and a trail edge holding member of the image transfer member engage to release the trail edge portion of the blanket to the image transfer member. The method 700 further includes sensing a position of the blanket device using a set of sensors distributed on the blanket device and the blanket replacement system and an encoder on at least one of the rotation motor and the engagement motor.

Figure 8:
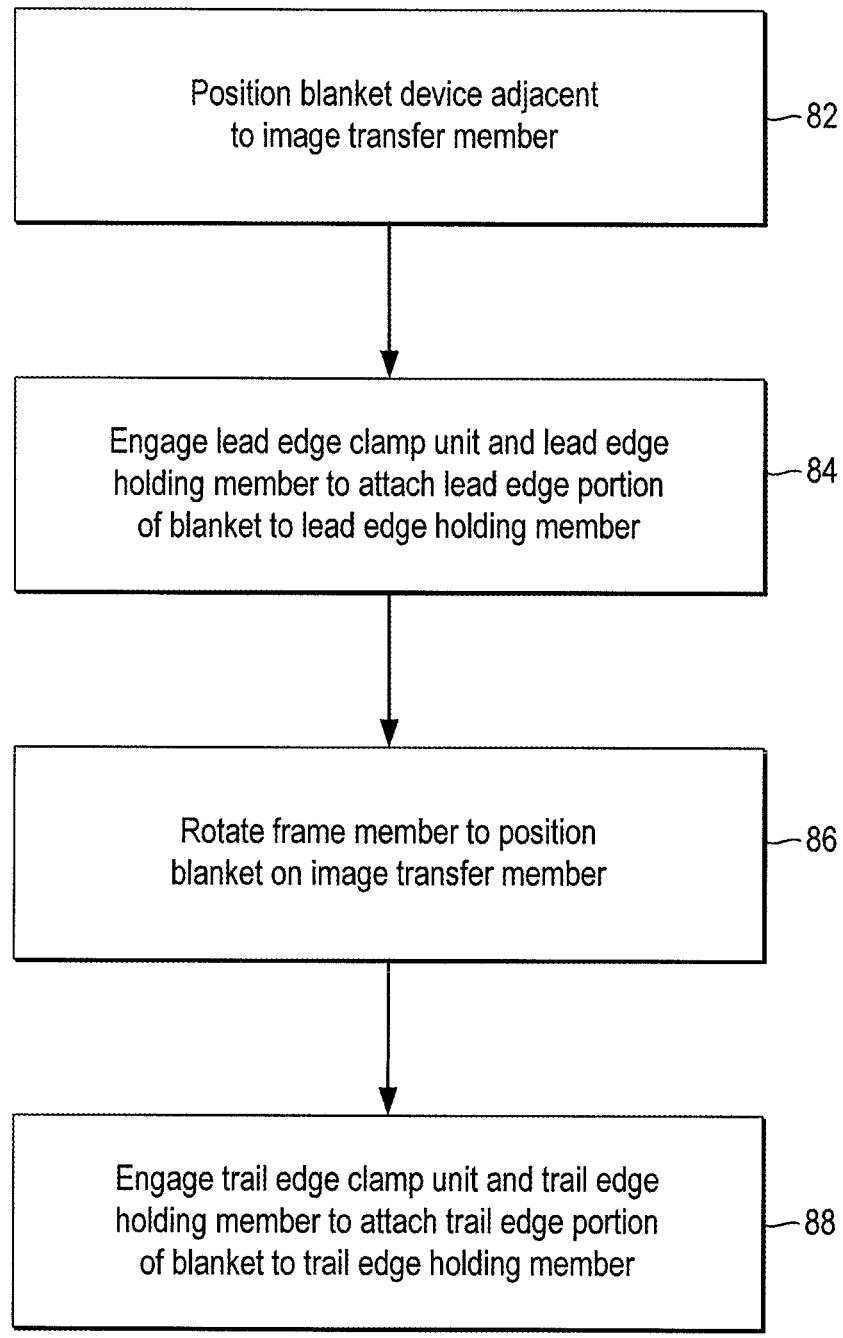
FIG. 8 illustrates a flow chart of a method to attach the blanket to an image forming member according to an example.

FIG. 8 illustrates a method 800 to attach a blanket to an image transfer member according to an example. In block 82, the method 800 positions a blanket device adjacent to the image transfer member. The blanket device is positioned by manual rotation of the blanket device from a storage position to an active position. In the active position, the blanket device is transported towards and away from the image transfer member using a transport unit including a timing belt and a rail.

The blanket device includes a frame member, an engagement motor, and a rotation motor. The frame member holds a blanket. The blanket having a lead edge portion on one edge and a trail edge portion on an opposing edge. The frame member includes at least one lead edge clamp unit and at least one trail edge clamp unit that engage with the image transfer member. The engagement motor engages with the frame member and moves the frame member laterally in relation to the engagement motor. The rotation motor is connected to the engagement motor and rotates the engagement motor and the frame member.

The method 800 engages at least one lead edge clamp unit and a lead edge holding member of the image transfer member, in block 84. The engagement attaches the lead edge portion of the blanket to a lead edge holding member of the image transfer member. The rotation of the engagement motor and the angular position of the image transfer member are synchronized to enable engagement therebetween. In block 86, the frame member is rotated with the rotation motor to position the blanket onto the image transfer member. The frame member and the image transfer member are both rotated in synchronization to position the blanket onto the image transfer member. Moreover, the blanket is held in tension between the image transfer member and the frame member during rotation. The at least one lead edge clamp unit and a trail edge holding member of the image transfer member engage with one another to attach the trail edge portion of the blanket to the image transfer member, in block 88.

The method 800 includes sensing a position of the blanket device using a set of sensors distributed on the blanket device and the blanket replacement system and an encoder on at least one of the rotation motor and the engagement motor. The method 800 further includes collection of a blanket paper attached to the blanket paper with a paper collection device. The paper collection device includes a collection motor that rotates in synchronization with the rotation motor as the blanket is attached to the image transfer member.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be exemplary. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A blanket replacement system useable with an image forming apparatus, the blanket replacement system comprising:
   a frame member to hold a blanket, the blanket having a lead edge portion on one edge and a trail edge portion on an opposing edge, the frame member having:
      a lead edge clamp unit to hold the lead edge portion of the blanket and to engage with a lead edge holding member of an image transfer member of the image forming apparatus, and
      at least one trail edge clamp unit to hold the trail edge portion of the blanket and to engage with a trail edge holding member of the image transfer member;
   an engagement motor to engage with the frame member and move the frame member laterally in relation to the engagement motor; and
   a rotation motor connected to the engagement motor to rotate the engagement motor and the frame member,
   wherein the frame member engages with the image transfer member to perform at least one of removal of the blanket from the image transfer member and attachment of the blanket to the image transfer member.

2. The blanket replacement system of claim 1, wherein removal of the blanket comprises:
   engagement of the at least one lead edge clamp unit and the lead edge holding member to connect the at least one lead edge clamp unit to the blanket and release the lead edge portion of the blanket from the image transfer member,
   rotation of the frame member by the rotation motor to separate the blanket from the image transfer member, and
   engagement of the at least one trail edge clamp unit and the trail edge holding member to release the trail edge portion of the blanket from the image transfer member.

3. The blanket of claim 1, wherein attachment of the blanket to the image transfer member comprises:
   engagement of the at least one lead edge clamp unit and the lead edge holding member to attach the lead edge portion of the blanket to the image transfer member;
   rotation of the frame member by the rotation motor to position the blanket onto the image transfer member, and
   engagement of the at least one trail edge clamp unit and the trail edge holding member to attach the trail edge portion of the blanket to the image transfer member.

4. The blanket replacement system of claim 1, wherein the image transfer member comprises an intermediate transfer member having the blanket thereon.

5. The blanket replacement system of claim 1, further comprising a transport unit connected to the rotation motor to move the rotation motor towards and away from the image transfer member, the transport unit including a timing belt and a rail.

6. The blanket replacement system of claim 5, further comprising a sensor unit including at least one of:

a lead edge sensor connected to the frame member to position the at least one lead edge clamp unit with respect to the lead edge holding member;
a trail edge sensor connected to the frame member to position the at least one trail edge clamp unit with respect to the trail edge holding member;
a transport sensor along the transport unit to position the rotation motor along the rail;
a rotation encoder to measure a first angular position of the rotation motor; and
an engagement encoder to measure a second angular position of the engagement motor.

7. The blanket replacement system of claim 1, further comprising a paper collection device having a collection motor to rotate in synchronization with the rotation motor to collect a blanket paper separated from the blanket as the blanket is attached to the image transfer member.

8. The blanket replacement system of claim 1, wherein the engagement motor and the frame member engage with one another using a set of frame gears and an engagement pinion to enable lateral motion of the frame member with respect to the engagement motor.

9. A method to attach a blanket to an image transfer member, the method comprising:
positioning a blanket device adjacent to the image transfer member, the blanket device including:
a frame member to hold the blanket, the blanket having a lead edge portion on one edge and a trail edge portion on an opposing edge, the frame member having at least one lead edge clamp unit and at least one trail edge clamp unit to engage with the image transfer member,
an engagement motor to engage with the frame member and move the frame member laterally in relation to the engagement motor, and
a rotation motor connected to the engagement motor to rotate the engagement motor and the frame member,
engaging the at least one lead edge clamp unit and a lead edge holding member of the image transfer member to attach the lead edge portion of the blanket to the lead edge holding member,
rotating, with the rotation motor, the frame member to position the blanket on the image transfer member, such that the blanket is held in tension between the image transfer member and the frame member, and
engaging the at least one trail edge clamp unit and a trail edge holding member of the image transfer member to attach the trail edge portion of the blanket to the image transfer member.

10. The method of claim 9, further comprising collecting a blanket paper attached to the blanket paper with a paper collection device having a collection motor that rotates in synchronization with the rotation motor as the blanket is attached to the image transfer member.

11. The method of claim 9, wherein positioning the blanket device includes:
rotating the blanket device from a storage position to an active position; and
transporting the blanket device towards and away from the image transfer member using a transport unit including a timing belt and a rail.

12. The method of claim 9, further comprising sensing a position of the blanket device using a set of sensors distributed thereon, and an encoder on at least one of the rotation motor and the engagement motor.

13. A method to remove a blanket from an image transfer member, the method comprising:
positioning a blanket device adjacent to the image transfer member, the blanket device including:
a frame member to hold the blanket, the blanket having a lead edge portion on one edge and a trail edge portion on an opposing edge, the frame member having at least one lead edge clamp unit and at least one trail edge clamp unit to engage with the image transfer member,
an engagement motor to engage with the frame member and move the frame member laterally in relation to the engagement motor, and
a rotation motor connected to the engagement motor to rotate the engagement motor and the frame member;
engaging the at least one lead edge clamp unit and a lead edge holding member of the image transfer member to release the lead edge portion of the blanket from the lead edge holding member,
rotating, with the rotation motor, the frame member to separate the blanket from the image transfer member and provide tension between the image transfer member and the frame member to remove the blanket from the image transfer member, and
engaging the at least one trail edge clamp unit and a trail edge holding member of the image transfer member to release the trail edge portion of the blanket from the image transfer member.

14. The method of claim 13, wherein positioning the blanket device includes:
rotating the blanket device from a storage position to an active position; and
transporting the blanket device towards and away from the image transfer member using a transport unit including a timing belt and a rail.

15. The method of claim 13, further comprising sensing a position of the blanket device using a set of sensors distributed thereon and an encoder on at least one of the rotation motor and the engagement motor.

* * * * *